US008670744B2

(12) United States Patent
Hurtta et al.

(10) Patent No.: US 8,670,744 B2
(45) Date of Patent: Mar. 11, 2014

(54) METHOD FOR PROVIDING CHARGING ATTRIBUTES

(75) Inventors: Tuija Hurtta, Espoo (FI); David Banjo, Espoo (FI); Jyrki Martti, Espoo (FI)

(73) Assignee: Nokia Corporation, Espoo (FI)

( * ) Notice: Subject to any disclaimer, the term of this patent is extended or adjusted under 35 U.S.C. 154(b) by 1981 days.

(21) Appl. No.: 11/069,256

(22) Filed: Mar. 2, 2005

(65) Prior Publication Data

US 2006/0153074 A1 Jul. 13, 2006

(30) Foreign Application Priority Data

Dec. 23, 2004 (FI) ...................................... 20041668

(51) Int. Cl.
*H04M 11/00* (2006.01)
*H04W 4/00* (2009.01)
(52) U.S. Cl.
USPC ......... 455/406; 455/405; 455/408; 455/432.3
(58) Field of Classification Search
USPC ................. 455/403, 405–408, 410, 418–420, 455/422.1, 432.1, 432.3, 433, 456.3, 466, 455/550.1, 552.1, 558, 560–561; 707/607
See application file for complete search history.

(56) References Cited

U.S. PATENT DOCUMENTS

| | | | | |
|---|---|---|---|---|
| 7,248,855 B2 * | 7/2007 | Joyce et al. | ................... | 455/406 |
| 7,548,743 B2 * | 6/2009 | Cai et al. | ....................... | 455/406 |
| 7,787,858 B2 * | 8/2010 | Koskinen et al. | ............. | 455/405 |
| 2003/0026404 A1 | 2/2003 | Joyce et al. | .............. | 379/144.01 |
| 2003/0069842 A1 * | 4/2003 | Kight et al. | ..................... | 705/39 |
| 2003/0120594 A1 * | 6/2003 | Shaginaw et al. | ............... | 705/40 |
| 2004/0072557 A1 | 4/2004 | Paila et al. | | |
| 2005/0102424 A1 * | 5/2005 | Foll et al. | ...................... | 709/240 |

FOREIGN PATENT DOCUMENTS

| | | |
|---|---|---|
| EP | 1 124 388 A2 | 8/2001 |
| EP | 1 265 397 A2 | 12/2002 |

OTHER PUBLICATIONS

Jyrki Martti; Requriements for the Charging RD, pp. 1-4, Aug. 13, 2004.
3GPP; Technical Specification Group Core Network: 3GPP Generic User Profile; Stage 3; Network (Release 6); V0.30 (Apr. 2004).
3GPP; Technical Specification Group Services and System Aspects; General Packet Radio Service (GPRS); Service description; Stage 2 9Release) V6.6.0 (Sep. 2004).
Lin, Yi-Bing et al., "*Approach for UMTS Third-Generation Mobile Networks*", IEEE Network, Sep./Oct. 2002, pp. 1-19.

* cited by examiner

*Primary Examiner* — Meless Zewdu
(74) *Attorney, Agent, or Firm* — Harrington & Smith (57) ABSTRACT

The invention relates to communication networks, specifically to service provisioning and authorization of service usage in different networks. The invention provides a method and a system for authorizing services for visiting subscribers and for obtaining the necessary charging profile information from the subscribers' home networks on a per-service basis.

16 Claims, 4 Drawing Sheets

METHOD FOR PROVIDING CHARGING ATTRIBUTES

FIELD OF INVENTION

The invention relates to communication networks, specifically to provision of charging attributes.

List of abbreviations

| | |
|---|---|
| 3GPP | 3rd Generation Partnership Project |
| AAA | Authentication, Authorization and Accounting |
| CDR | Call Detail Record |
| DCCA | Diameter Credit-Control Application |
| GGSN | Gateway GPRS Support Node |
| GPRS | General Packet Radio Service |
| GSM | Groupe Spéciale Mobile |
| GUP | Generic User Profile |
| HLR | Home Location Register |
| HPLMN | Home Public Land Mobile Network |
| IMSI | International Mobile Subscriber Identifier |
| IPSC | IP Session Control node |
| MCC | Mobile Commerce and Charging |
| MO | Mobile Operator |
| MT | Mobile Terminal |
| OSC | Online Service Controller |
| PDG | Packet Data Gateway |
| PDP | Packet Data Protocol |
| SP | Service Provider |
| TPSP | Third Party Service Provider |
| TR | Technical Report |
| VPLMN | Visited Public Land Mobile Network |
| WSI | Web Service Interface |

TECHNICAL BACKGROUND

Current cellular telecommunication systems employ mechanisms that enable a mobile user to be authorised to use services provided within his or her home network. Certain mechanisms that authorise network access in home and visited networks are also known by a man skilled in the art.

However, current solutions are lacking in that a generic, service-based mechanism is however needed to authorise the use of services offered by a network to visiting subscribers. Such a mechanism would need to obtain certain subscriber attributes from the home network in order to perform authorisation. This authorisation can be only partially provided by existing mechanisms such as AAA, or VPLMN access attributes defined in the GSM/GPRS HLR.

The 3GPP standards define various control mechanisms and parameters (e.g. in 3GPP TS 23.060) that are stored within an HLR (Home Location Register) dictating whether a subscriber may utilise visited network services, and what charging characteristics (e.g. normal, prepaid, flat-rate, and/or hot billing subscription) apply to the subscriber or PDP context. These known mechanisms however are bearer specific and do not support per-service charging well. In particular, these known mechanisms do not support on a per-service basis for a given subscriber determination of service authorisation, charging method or charging system address.

Further, certain authentication protocols such as RADIUS and Diameter are typically used for network access authorisation. Adapting them for performing service-based authorisation would require the use of non-standard extensions to the protocol; thereby not offering a standardised solution.

Current solutions do not provide a generic mechanism that would allow a visiting subscriber to use a specific service, resolve how the subscriber should be charged, and would resolve the charging server or the balance server to which credit control messages should be directed.

SUMMARY OF THE INVENTION

The invention provides a method for providing charging attributes in a communication system. The method comprises at least the steps of receiving a service authorization request by a service authorization node in a first network, transmitting of a charging attribute request to a request receiver in a second network, determining which charging attribute storage node can satisfy said charging attribute request, transmitting charging attribute information from a charging attribute storage node, and transmitting a service authorization reply by said service authorization node.

The charging attributes may be service and subscriber-specific attributes. Advantageously, said step of transmitting a charging attribute request is performed as a response to said step receiving a service authorization request, whereby said charging attribute request is related to said service authorization request.

In a further advantageous embodiment of the invention, the method further comprises the steps of transmitting a charging attribute request by said request receiver to a charging attribute storage node, receiving charging attribute information by said request receiver from said charging attribute storage node, and transmitting charging attribute information by said request receiver to said service authorization node.

The method may also further comprise the steps of transmitting information identifying a charging attribute storage node from said request receiver to said service authorization node, and transmitting a charging attribute request by said service authorization node to said charging attribute storage node.

The request receiver node may also transmit information identifying said authorization node to a charging attribute storage node, whereafter the charging attribute storage node can transmit charging attribute information directly to said service authorization node.

In a further advantageous embodiment of the invention, the method further comprises the steps of determining the home network of the subscriber identified in said service authorization request, and determining address information of a request receiver in said home network of the subscriber.

The invention also provides a system for providing charging attributes in a communication system having a plurality of networks. The system comprises a service authorization node in a first network for receiving service authorization requests and transmitting charging attribute requests to request receivers in other networks, a request receiver in a second network for receiving a charging attribute request and for determining which charging attribute storage node in said second network can satisfy said charging attribute request, and at least one charging attribute storage node in said second network for storing charging attributes and for responding to charging attribute requests.

The service authorization node may as well be responsible for transmitting such charging attribute requests to a request receiver within the same network. This may happen especially when the service authorization node receives a service authorization request concerning a subscriber whose home network is the network in which the service authorization node is located.

The invention also provides a service authorization node for a communications network. According to this aspect of the invention, the system comprises at least means for receiving service authorization requests, means for transmitting charging attribute requests, means for determining the request receiver of the home network of a subscriber identified in an authorization request, and means for receiving charging attribute information.

In an advantageous embodiment of this aspect of the invention, the service authorization node further comprises means for transmitting charging attribute requests to a request receiver in a home network of a subscriber identified in an authorization request, means for receiving charging attribute information from a request receiver, and means for replying to service authorization requests.

The service authorization node may also comprise means for transmitting charging attribute requests to a charging attribute storage node, means for receiving charging attribute information from a charging attribute storage node, and means for replying to service authorization requests.

The invention also provides a service authorization node for a communications network comprising at least a receiver configured to receive service authorization requests, a transmitter configured to transmit charging attribute requests, a controller configured to determine the request receiver of the home network of a subscriber identified in an authorization request, and a receiver configured to receive charging attribute information.

According to an advantageous embodiment of this aspect of the invention, the service authorization node further comprises a transmitter configured to transmit charging attribute requests to a request receiver in a home network of a subscriber identified in an authorization request, a receiver configured to receive charging attribute information from a request receiver, and a controller configured to reply to service authorization requests.

According to a further advantageous embodiment of this aspect of the invention, the service authorization node further comprises a transmitter configured to transmit charging attribute requests to a charging attribute storage node, a receiver configured to receive charging attribute information from a charging attribute storage node, and a controller configured to reply to service authorization requests.

The invention also provides a charging attribute request receiver node for a communication system. According to this aspect of the invention, the charging attribute request receiver node comprises at least means for receiving charging attribute requests, and means for determining which charging attribute storage node of a plurality of storage nodes can satisfy a received charging attribute request.

The invention also provides a method for authorizing charging in a communication system. According to this aspect of the invention, the method comprises at least the steps of receiving a service authorization request from a service node, determining of a request receiver in a home network of a subscriber identified in a service authorization request, transmitting a charging attribute request to said request receiver, receiving charging attribute information, and transmitting a reply to said service authorization request.

According to an advantageous embodiment of this aspect of the invention, the method further comprises at least the steps of receiving information identifying a charging attribute storage node, transmitting a charging attribute request to said charging attribute storage node, and receiving charging attribute information from said charging attribute storage node.

The invention also provides a method for managing charging attribute requests in a communication system. According to this aspect of the invention, the method comprises at least the steps of receiving a charging attribute request, determining which charging attribute storage node can satisfy said charging attribute request, transmitting said charging attribute request to a charging attribute storage node which can satisfy said charging attribute request, receiving charging attribute information from selected charging attribute storage node, and transmitting charging attribute information to the node which sent said charging attribute request.

The invention also concerns a method for managing charging attribute requests in a communication system. According to this aspect of the invention, the method comprises at least the steps of receiving a charging attribute request from a node within a second network, determining which charging attribute storage node can satisfy said charging attribute request, and transmitting information identifying a charging attribute storage node which can satisfy said charging attribute request to said second network node.

According to a still further aspect of the invention, there is provided a method for managing charging attribute requests in a communication system in a network node within a first network of said cellular telecommunication system. According to this aspect of the invention, the method comprises at least the steps of receiving a charging attribute request from a node within a second network, determining which charging attribute storage node can satisfy said charging attribute request, transmitting said charging attribute request to a charging attribute storage node that can satisfy said charging attribute request, and transmitting information identifying said second network node to said charging attribute storage node that can satisfy said charging attribute request.

These inventive methods can also be implemented in software, by implementing the method steps using computer program code means which may be executed on a processor of a network element of a communication system.

Many communication systems consist of a plurality of networks connected to a core network, each network covering a specific geographical area, which areas may or may not overlap. Further, different networks connected to the same core network may also use different technologies. For example, a single GSM network may cover a large region, while a smaller WLAN network may cover a part of a city within the same region. The invention is not limited to any particular radio access network technology or type.

BRIEF DESCRIPTION OF THE DRAWINGS

Embodiments of the present invention will now be described by way of example with reference to the accompanying drawings, in which.

DETAILED DESCRIPTION OF VARIOUS EMBODIMENTS

Figure 1:
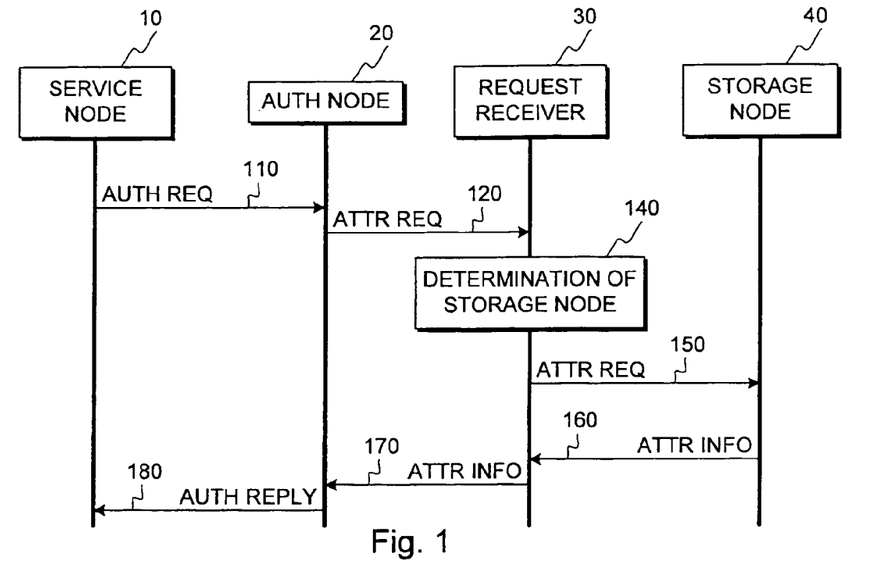
FIG. 1 illustrates a method according to an advantageous embodiment of the invention.

FIG. 1 illustrates signalling according to an advantageous embodiment of the invention. FIG. 1 shows signalling between a network node 10 providing services for subscribers, a service authorization node 20, a charging attribute request receiver node 30, and a charging attribute storage node 40. FIG. 1 indicates signalling after a roaming subscriber has initiated the use of a service provided by the visited network. The network node 10 providing the service (e.g. a service flow aware GGSN network node) requests 110 authorisation for the use of the specific service by the visiting subscriber.

In an actual implementation of the invention in a cellular telecommunication system, the service authorization node (in 3GPP standards, the function providing the services of a service authorization node is generally called a Service Authorisation Function) may be the same that provides authorisation of the network's own subscribers, or may be different for visiting users. The network node 10 providing the service may or may not know that the user is a visiting subscriber from another network.

If is not already previously established that the subscriber is a visiting subscriber the authorisation function will establish this (e.g. via IMSI analysis) and also determine the network to which the user belongs (not depicted in FIG. 1).

The service authorization node transmits 120 a charging attribute request to a charging attribute request receiver node 30 in the subscriber's home network. In 3GPP standards, the charging attribute request receiver node 30 may be denoted as an External Profile Gateway. The requested profile attributes may for example include service authorisation, subscriber's charging method, and charging server address(es). The network address of the charging attribute request receiver node 30 may for example be statically configured between cooperating networks, or may for example be dynamically discovered e.g. using a mechanism such as the mechanism known to a man skilled in the art as Liberty Discovery.

The charging attribute request receiver node 30 determines 140 which charging attribute storage node (or nodes) 40 can satisfy the request received, and transmits 150 the request to that storage node.

In various implementations of the invention in various cellular networks, the request may need to be reformatted or otherwise modified by the charging attribute request receiver node 30, before it can be sent to the storage node 40. This may happen e.g. if the cellular telecommunication system is comprised of a variety of differing networks implemented using different standards. In such a case, the attribute request receiver node 30 may advantageously perform any needed attribute mapping, protocol translation, or other changes as may be necessary.

Next, the charging attribute storage node 40 returns 160 the results of the request, i.e. charging attribute information back to the attribute request receiver node 30, which transmits 170 the charging attribute information back to the service authorization node 20.

Finally, the service authorization node 20 returns 180 a service authorisation response to the network node 10 providing the requested service. The service authorisation response may advantageously include the charging method applicable to the subscriber and service and, if required due to online charging the address of the charging server to which the charging information should be directed.

After receiving the authorization reply, in the event that the reply allows the service to be provided, the network node 10 providing the service can start providing the requested service to the subscriber.

Figure 2:
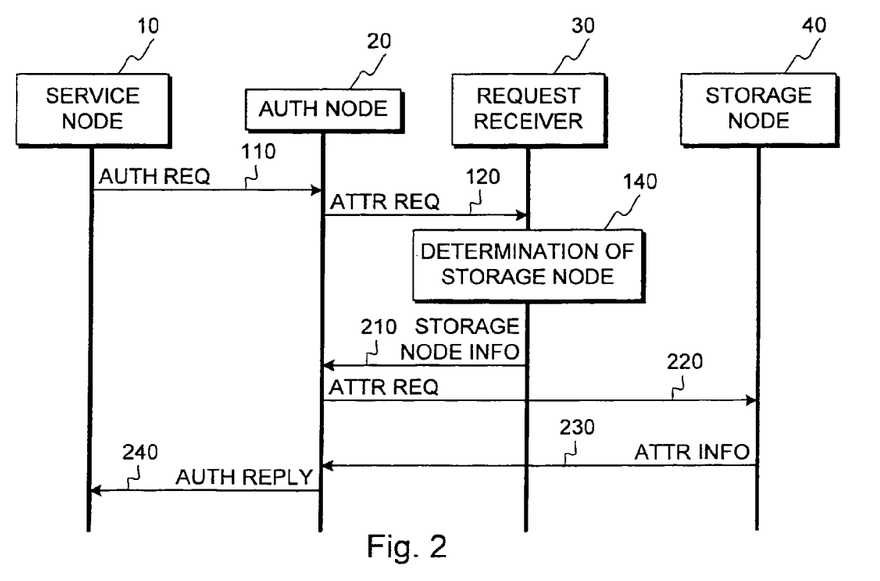
FIG. 2 illustrates a method according to a further advantageous embodiment of the invention.

FIG. 2 illustrates signalling according to a further advantageous embodiment of the invention. FIG. 2 shows signalling between a network node 10 providing services for subscribers, a service authorization node 20, a charging attribute request receiver node 30, and a charging attribute storage node 40. FIG. 2 indicates signalling after a roaming subscriber has initiated the use of a service provided by the visited network. The network node 10 providing the service (e.g. a service flow aware GGSN network node) requests 110 authorization for the use of the specific service by the visiting subscriber.

If is not already previously established that the subscriber is a visiting subscriber the authorisation function will establish this (e.g. via IMSI analysis) and also determine the network to which the user belongs (not depicted in FIG. 2).

The service authorization node transmits 120 a charging attribute request to a charging attribute request receiver node 30 in the subscriber's home network. The charging attribute request receiver node 30 determines 140 which charging attribute storage node (or nodes) 40 can satisfy the request received, and transmits 210 information about such a charging attribute storage node (or nodes) to the service authorization node 20. Such information may advantageously include e.g. the network address, domain name, or other identifying information about the charging attribute storage node.

Next, the service authorization node 20 transmits 220 a charging attribute request to the indicated charging attribute storage node 40. The charging attribute storage node 40 returns 230 the results of the request, i.e. charging attribute information back to the service authorization node 20.

Finally, the service authorization node 20 returns 240 a service authorisation response to the network node 10 providing the requested service. The service authorisation response may advantageously include the charging method applicable to the subscriber and service and, if required due to online charging the address of the charging server to which the charging information should be directed.

After receiving the authorization reply, in the event that the reply allows the service to be provided, the network node 10 providing the service can start providing the requested service to the subscriber.

Figure 3:
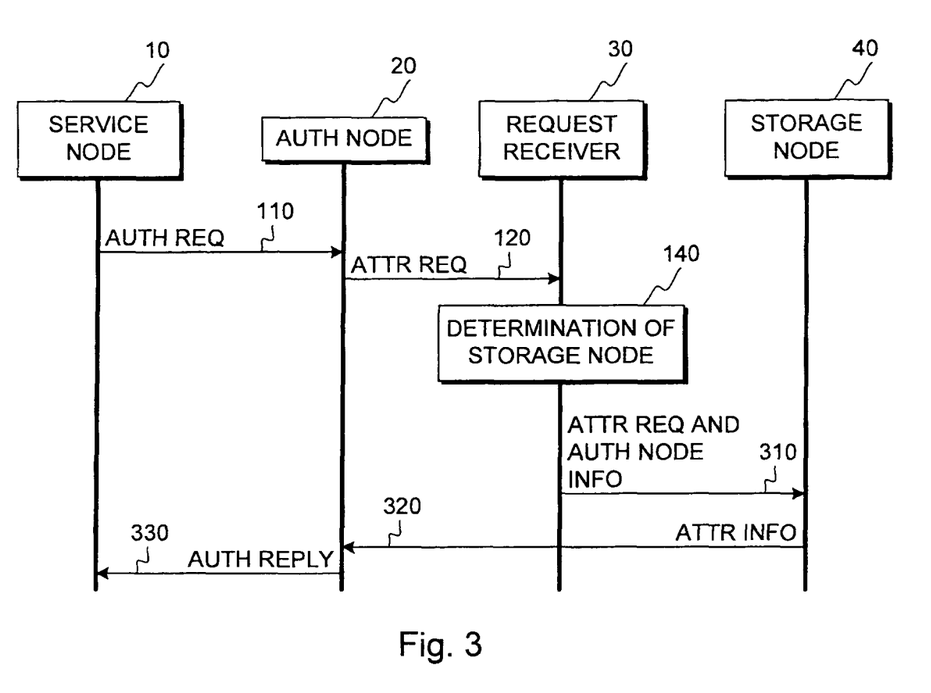
FIG. 3 illustrates a further method according to a still further advantageous embodiment of the invention.

FIG. 3 illustrates signalling according to a further advantageous embodiment of the invention. FIG. 3 shows signalling between a network node 10 providing services for subscribers, a service authorization node 20, a charging attribute request receiver node 30, and a charging attribute storage node 40. FIG. 3 indicates signalling after a roaming subscriber has initiated the use of a service provided by the visited network. The network node 10 providing the service (e.g. a service flow aware GGSN network node) requests 110 authorization for the use of the specific service by the visiting subscriber.

If is not already previously established that the subscriber is a visiting subscriber the authorisation function will establish this (e.g. via IMSI analysis) and also determine the network to which the user belongs (not depicted in FIG. 3).

The service authorization node transmits 120 a charging attribute request to a charging attribute request receiver node 30 in the subscriber's home network. The charging attribute request receiver node 30 determines 140 which charging attribute storage node (or nodes) 40 can satisfy the request received, and transmits 310 the request to that storage node. In the current embodiment of the invention, the charging attribute request receiver node 30 also transmits 310 information identifying the service authorization node 20 to the charging attribute storage node 40.

Next, the charging attribute storage node 40 returns 320 the results of the request, i.e. charging attribute information back to the charging attribute information back to the service authorization node 20.

Finally, the service authorization node 20 returns 330 a service authorisation response to the network node 10 providing the requested service. The service authorisation response may advantageously include the charging method applicable to the subscriber and service and, if required due to online charging the address of the charging server to which the charging information should be directed.

After receiving the authorization reply, in the event that the reply allows the service to be provided, the network node 10 providing the service can start providing the requested service to the subscriber.

In an advantageous embodiment of the invention the charging attribute request receiver node is implemented within a 3GPP GUP Server and the Subscriber Charging Profile as a GUP Component. The GUP is, at the time of writing of this patent application, currently being defined within 3GPP TS 29.240.

Figure 4:
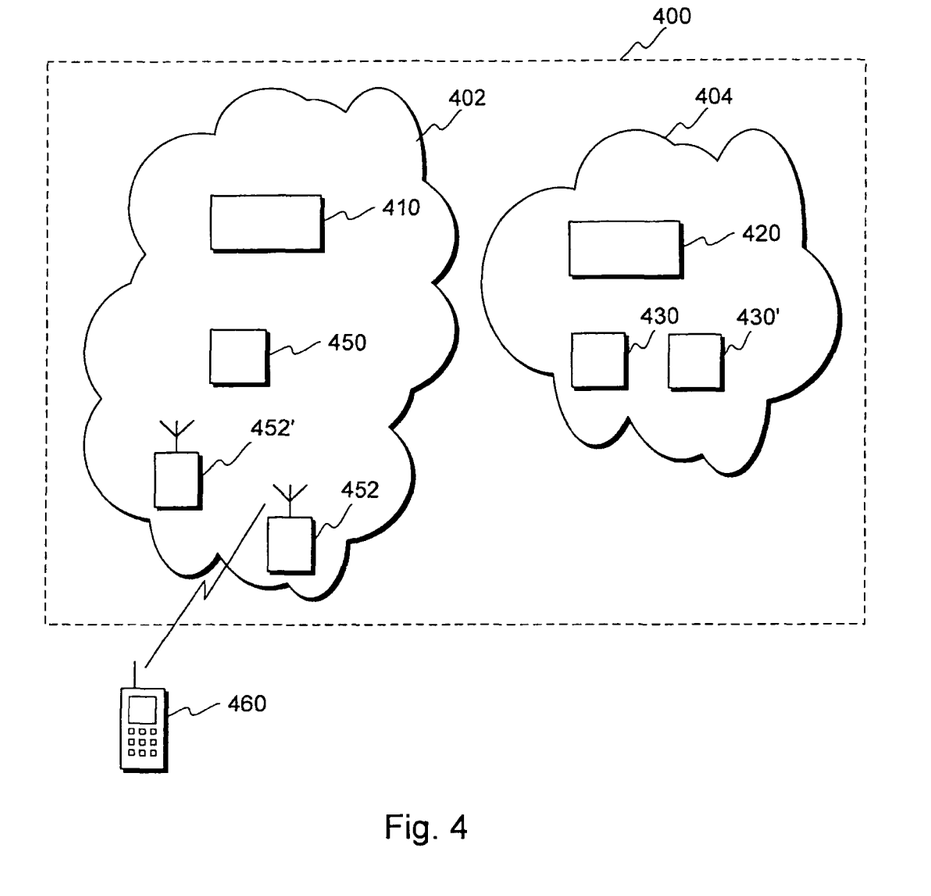
FIG. 4 illustrates a system according to an advantageous embodiment of the invention.

FIG. 4 illustrates a system according to an advantageous embodiment of the invention. The system provides charging attributes in a cellular telecommunication system 400 having a plurality of networks 402, 404. FIG. 4 shows a mobile station 460 communicating with a first network 402 via a base station 452, 452'. FIG. 4 also shows a network node 450 providing services to subscribers, a service authorization node 410, a request receiver 420, and a charging attribute storage node 430. The service authorization node 410 in the first network 402 is configured to receive authorization requests and to transmit charging attribute requests to request receivers 420 in other networks 404. The request receiver 420 in a second network 404 is configured to receive charging attribute requests and to determine which charging attribute storage node 430, 430' in said second network 404 can satisfy said charging attribute request. The second network 404 has charging attribute storage nodes 430, 430' for storing charging attributes and for responding to charging attribute requests. In this description of the example of FIG. 4 it is assumed that the mobile station 460 is roaming outside its home network 404, and requesting a service from a network node 450 providing services. The network node 450 providing services transmits a service authorization request to service authorization node 410 as a response to receiving a service request from the mobile station 460. The service authorization node 410 observes that the service request concerns a roaming subscriber from another network, and sends a charging attribute request to a request receiver 420 in the home network 404 of the subscriber. The request receiver 420 determines which charging attribute storage node 430, 430' can satisfy the charging attribute request, and forwards the request to such a storage node. The storage node responds with the requested attributes, which the request receiver 420 transmits to the service authorization node 410. Upon examining the received attribute information, the service authorization node 410 transmits a reply to the network node 450 providing services, which is then able to continue negotiation and/or providing services to the mobile station 460.

The request receiver 420 may perform the determination of which charging attribute storage node 430, 430' can satisfy the charging attribute request using the type of attribute information requested (such as charging attributes, subscribed services, or for example personal preferences) and the subscriber identity. The request receiver node 420 may for example comprise a configuration database or a configuration file indicating, which storage nodes store which types of attribute information, and for which groups of subscribers.

Figure 5:
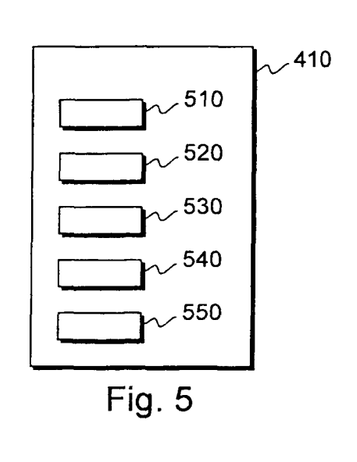
FIG. 5 illustrates a service authorization node according to an advantageous embodiment of the invention.

FIG. 5 illustrates in more detail a service authorization node 410 for a cellular telecommunications network according to an advantageous embodiment of the invention. In the example of FIG. 5, the service authorization node 410 comprises a receiver 510 configured to receive service authorization requests, a transmitter 520 configured to transmit charging attribute requests, a controller 530 configured to determine the request receiver of the home network of a subscriber identified in an authorization request, and a receiver 540 configured to receive charging attribute information.

In a further advantageous embodiment of the invention, the transmitter 520 may transmit charging attribute requests to a request receiver in a home network of a subscriber identified in an authorization request. Further, the receiver 540 for receiving charging attribute information may receive the information from such a request receiver. Further, the service authorization node 410 may comprise a controller 550 for replying to service authorization requests.

In a still further advantageous embodiment of the invention, the transmitter 520 for transmitting charging attribute requests may transmit charging attribute requests directly to a charging attribute storage node, and the receiver 540 for receiving charging attribute information may receive such information directly from a charging attribute storage node.

The components 510, 520, 530, 540, and 550 of the service authorization node can be implemented in many different ways. For example, they can be implemented using software, and functionalities of said components may be combined in various ways.

Figure 6:
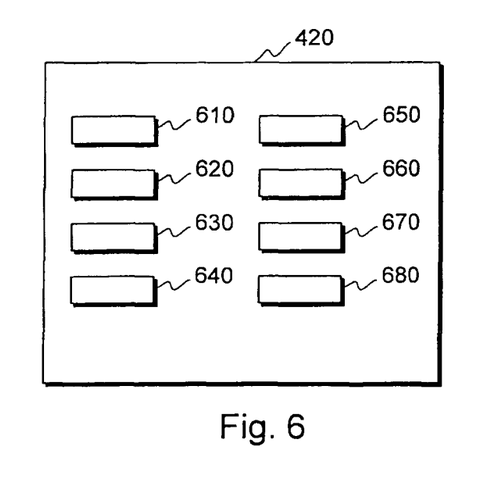
FIG. 6 illustrates a charging attribute request receiver node according to an advantageous embodiment of the invention.

FIG. 6 illustrates in more detail a charging attribute request receiver node 420. In the example of FIG. 6, the request receiver node 420 comprises at least a receiver 610 configured to receive charging attribute requests, and a controller 620 configured to determine which charging attribute storage node of a plurality of storage nodes can satisfy a received charging attribute request.

According to a further advantageous embodiment of the invention, the request receiver node 420 further comprises at least a transmitter 630 configured to transmit a charging attribute request to a charging attribute storage node, a receiver 640 configured to receive charging attribute information from a charging attribute storage node, and a transmitter 650 configured to transmit charging attribute information to a service authorization node.

According to a still further advantageous embodiment of the invention, the charging attribute request receiver node 420 further comprises at least a transmitter 660 configured to transmit information identifying a charging attribute storage node to a service authorization node. The information identifying the charging attribute storage node may be for example a network address or a domain name.

According to an even further advantageous embodiment of the invention, the charging attribute request receiver node 420 further comprises at least a transmitter 670 configured to transmit a charging attribute request to a charging attribute storage node, and a transmitter 680 configured to transmit information identifying a service authorization node to a charging attribute storage node. This identifying information allows a charging attribute storage node to send the reply comprising the desired charging attribute information directly to the service authorization node.

The components 610, 620, 630, 640, 650, 660, 670, and 680 of the charging attribute request receiver node 420 can be implemented in many different ways. For example, they can be implemented using software, and functionalities of said components may be combined in various ways.

The inventive method can also be implemented in software. Appropriately adapted computer program code may be used for implementing embodiments of the invention described in this specification as well as their various variations. The program code product for providing the operation may be stored on and provided by means of a carrier medium such as a carrier disc, card, or tape. A possibility is to download the program code product via a data network. Implementation of various embodiments may be provided with appropriate software in a server.

A second aspect of the invention provides mechanisms and methods for locating a subscriber directory storing subscription profiles or components of subscription profiles, based on a user identifier. These mechanisms and methods may be used for example in relation with IP based services, where an IPSC (IP Session Control node) node may need to check whether a service requested by a mobile station can be provided, and related subscriber information needs to be obtained from a subscriber directory. These mechanisms and methods may advantageously be used for finding a subscriber directory in cases, where the subscriber is roaming outside his/her home network.

According to an advantageous embodiment of the second aspect of the invention, the IPSC is used to store information linking user groups to corresponding subscriber directory identifying information. The identifying information can be for example the name or address of the subscriber directory.

The IPSC analyses the user identifier which is received when a GGSN/PDG (Gateway GPRS Support Node/Packet Data Gateway) contacts the IPSC, which contacting can happen e.g. during bearer establishment. The IPSC first determines the user group on the basis of the received user identifier, and thereafter obtains the corresponding subscriber directory identifying information.

More than one Subscriber Directory may be configured per user group. This is the case e.g. if a subscription profile consists of components. As an example, the name and/or address of the Subscriber Directory storing subscription info for service authorization may be different than the name and/or address of the Subscriber Directory storing subscription info for rule creation.

According to a further advantageous embodiment of the invention, an address resolver function is provided. In this embodiment, the IPSC may advantageously store information about which address resolver function correspond to which user group.

In this embodiment, the locating of a subscriber directory proceeds as follows. The IPSC first determines the user group information on the basis of a received user identifier, and then the name or address of the address resolver function. Subsequently, the IPSC sends a request to the address resolver function, which replies with the name or address of the subscriber directory having the information particular to the user or the user group, whereafter IPSC may obtain the information from the identified subscriber directory. The request may contain the user identifier or information identifying the user group. The request may also contain information about which type of information is sought from a subscriber directory, as different subscriber directories may provide different types of information, whereby the type of subscriber information sought may affect the choice of subscriber directory. Such different subscriber information types can be for example information on whether a user or a user group is entitled to use a specific access point or access network; whether subscription information related to roaming is needed; or for example if subscription information related to a particular service is needed.

In the following we describe certain advantageous embodiments related to a third aspect of the invention. These embodiments are related to co-operation of an online charging method with an offline charging method.

These embodiments relate to online charging of services provided by third party service providers utilizing bearer services offered by a mobile operator. Scenarios related to these embodiments have three stakeholders: an end-user using a mobile terminal (MT), a mobile operator (MO) and a third party service provider (TPSP).

A TPSP provides services for the end-users. The end-users are subscribers of a MO and use their access network of their operator to contact the service portal of the TSPS. The embodiments are related to an online charging interface between a TSPS and a MO. The TSPS uses the charging interface to charge the end-users via operator billing for the services the end-users are using.

A first of these embodiments of the third aspect of the invention describes how traditional offline charging subscription methods can be supported via an online charging interface.

Although online based charging such as prepaid services is becoming more revalent, much of the charging of subscribers is still based on traditional offline charging methods where the subscription is typically a post-paid or a monthly contract subscription. One main reason for this is that offline charging (e.g. via call detail records, CDRs) generally requires a more detailed set of charging information than that permitted within a purely offline mechanism.

Nevertheless, service providers want to sell their products or services in a way that the end-user is able to use his mobile phone to buy a product or a service. There exists also a need to use the end-user's user account (operator bill) in order to charge the end-user for the product or the service.

While most of the currently known solutions try to solve the situation by debiting the end user's prepaid account, this embodiment describes a solution, wherein end-users having subscriptions that rely on an off-line charging mechanisms, can be charged via an on-line charging interface.

This embodiment has the advantage that it will increase the potential customer base of the service provider and reduce complexity in implementing a charging interface; and also make the services of the mobile network operator more attractive for the service providers. As there exists also a need for the network operator to be able to provide converged online/offline charging solutions, in this way the network operator only needs to implement one charging interface towards the third party service providers.

The core idea for this embodiment is the use of an online charging web service interface for support of offline charging. This embodiment involves a new method being introduced to the online interface whereby the TPSP charging client informs the MO charging server that it will transmit the charging data—which is actually offline charging data—e.g. in a pre-negotiated CDR format. The offline charging can be supported for example via a special request over the same online charging interface that the TPSP is using for charging the subscribers having a subscription with an online charging method.

An example of how service provision can proceed according to the current embodiment is presented in the following.

This example assumes that an end-user is browsing a web portal of the TPSP. The end-user selects a game to download to his mobile phone. As a response to the selection, the system of TPSP providing the web portal services transmits through the charging web service interface of the mobile operator (MO) a request to check if the end user has enough credits for the game download. The MO answers via the service interface that the subscription of the end-user supports only an off-line charging method, and that it can be used for charging. After receiving the answer, the TPSP begins to deliver the service and gather information related to the service. After the service is successfully delivered the TPSP sends the charging information over the charging web service interface in a predetermined format (e.g. as a Charging Data Record, CDR). The MO adds the charges to the phone bill of the end user based on the charging information received from the TPSP.

A second embodiment of the third aspect of the invention describes how the TPSP can resolve the charging method of an end-user that is a subscriber of a MO. Before the TPSP can charge the end-user for a service requested by the end-user, it needs to resolve the end-user's charging method, e.g. if the charging method is an on-line or an off-line method.

The inventors envision that the service provider will in most cases not be able to access the end-user's service profile, as maintained by the operator, in order to discover the subscriber's charging method. The second embodiment of the third aspect of the invention provides a mechanism to check the end-user's charging method, via the charging interface used between the TPSP and the operator.

Such a mechanism can be implemented in an existing query method. For example, a charging interface typically provides a method for checking the balance of the subscriber's account for online charging. The charging server can indicate that a subscriber has an off-line charged account by returning a specific value or a range of values. The TPSP can then check the returned balance information, and determine from that whether off-line charging should be used instead of online charging. Other query methods than checking of balance can also be used for checking and indicating whether offline charging should be used. Examples of other suitable query methods include methods for credit check, credit reservation or credit deduction.

It is also possible to implement a dedicated method within the interface for querying the subscriber's charging method.

This second embodiment of the third aspect of the invention has several advantages. In earlier solutions, the service providers have generally been unable to resolve the end-user's charging method before allowing a service. This has meant that, in most cases, many third party services have not been made available to pre-paying subscribers, as it is often impracticable for a TPSP to directly query a subscriber database of a MO or maintain its own database of the subscriber profiles of the MO.

This embodiment makes it easier for TPSPs to get new customers. The TPSP only needs to be able resolve the MO whose subscriber the end-user is. The TPSP does not need to maintain a database of the end-users charging methods, because a request over a charging interface can be used to determine the charging method.

Figure 7:
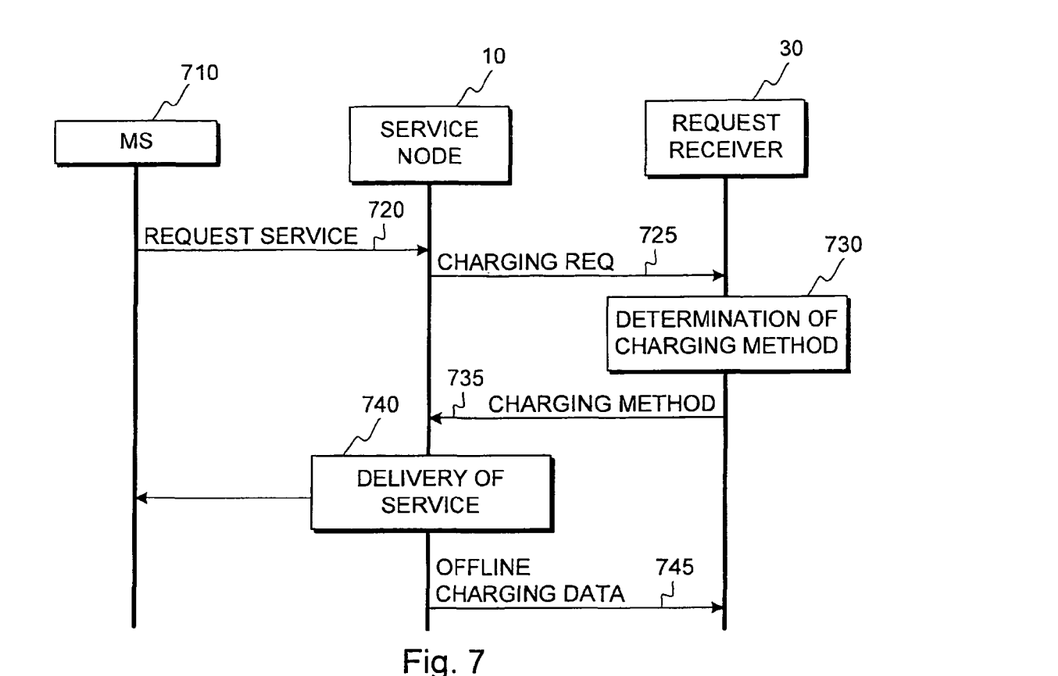
FIG. 7 illustrates signalling between a mobile station, a service node, and a request receiver.

FIG. 7 illustrates signalling flow according to an exemplary embodiment. FIG. 7 illustrates signalling between a mobile station 710, a service node 10, and a request receiver node 30. In step 720, the mobile station transmits 720 a request for a service to the service node 10. The service node wishes to receive credits for the service and delivery of the service, and sends 725 a charging request to the request receiver for example via an online charging interface. The request receiver processes the request and determines 730 the charging methods of the subscriber based on the received information, observing that the only offline charging can be used with this subscriber. In step 735, the request receiver node transmits charging method information to the service node. In step 740, the service node delivers the requested service. After delivering the service, the service node transmits 745 the off-line charging data for example using the same online charging interface to the request receiver.

According to a third embodiment of the third aspect of the invention the TPSP can initiate a change to an ongoing charging session as well as to an ongoing service. This could, for example, be used to change the way a related access session is charged.

The TPSP may want to effect a change to the charging of an ongoing service session for various reasons, when some event in the session occurs. For example during a gaming session the end-user may enter a new game level in an online playing session, which may require changing of the charging of the user. For example, the game could give the player free playing time as a bonus. Depending on the service being provided, changing of charging parameters may need to be applied by the charging server not only to the charging session between the TPSP and the MO, but also to a concurrent related charging session towards the access network.

This embodiment can be realized for example via a dedicated request within an ongoing charging session that provides a trigger to modify the session and/or related charging sessions.

Figure 8:
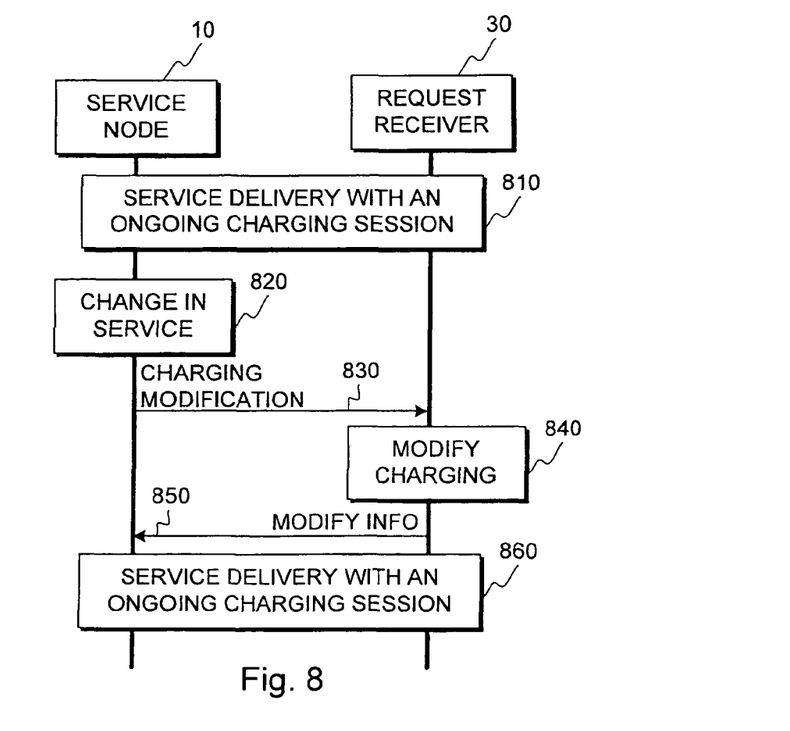
FIG. 8 illustrates signalling between a service node and a request receiver.

FIG. 8 illustrates an example of signalling flow between a service node 10 and request receiver 30. In this example, a service delivery is proceeding 810 with an ongoing charging session. In step 820, an event occurs in the service, an event which requires changes in the ongoing charging session. In step 830, the service node transmits a charging modification request to the request receiver for example via an online charging interface. In step 840, the request receiver modifies the charging attributes and possibly also the service delivery attributes. In step 850, the request receiver informs the service node about which modifications in the charging attributes were made. In step 860, delivery of the service is continued with the new charging attributes.

In this specification, the term charging attribute refers to information related to control of charging of a subscriber. Examples of charging attributes include information on which services a subscriber is allowed to access, which methods can be used to charge a subscriber, and which network node or nodes are the charging servers for this subscriber.

In this specification, the term node refers to a logical entity, i.e. set of functionalities, which can be implemented in many different ways. For example, each node can be implemented in a separate physical network device. As a further example, a plurality of various nodes can be implemented in a single hardware device.

The invention has several advantages. The invention provides a generic, bearer independent solution for the problems present in the prior art. The invention also offers a generic mechanism able to uniquely define a charging server address, for all servers (including those in the home network of a subscriber), which solves problems currently identified e.g. where GPRS and IMS systems do not share a common mechanism for providing such information.

It is noted that while the preceding description illustrates various embodiments of the invention within a 3G cellular telecommunications system, the invention is not limited to a so called 3G cellular system, but can be implemented in different types of communication systems as well.

It is also noted herein that while the above describes exemplifying embodiments of the invention, there are several variations and modifications which may be made to the disclosed solution without departing from the scope of the present invention as defined in the appended claims.

The invention claimed is:

1. An apparatus, comprising:
   at least one processor; and
   at least one memory including computer program code, where the at least one memory and the computer program code are configured, with the at least one processor, to cause the apparatus to at least:
   receive a service authorization request in response to a mobile station generating a request for a particular service, where the mobile station is roaming in a first network that comprises the apparatus;
   determine a charging attribute storage node of a plurality of charging attribute storage nodes associated with a home network of the mobile station which can satisfy a service charging attribute request for the service authorization; and
   transmit the service charging attribute request towards the determined charging attribute storage node of the plurality of charging attribute storage nodes associated with the home network of the mobile station; and
   receive service charging attribute information from said determined charging attribute storage node of the plurality of charging attribute storage nodes associated with the home network of the mobile station, the service charging attribute information comprising charging attributes of the mobile station for use by the first network in providing charging data to the home network in order to charge an end-user of the mobile station for the particular requested service, where the charging attribute information includes an indication of an online or an offline charging method used by the mobile station, where for a case that the charging attributes include an indication of an online charging method, the charging attribute information further includes an address of a charging server to which charging information should be directed, and for a case that the charging attributes include an indication of an offline charging method, the apparatus is caused to send offline charging data to the request receiver after a requested service is delivered to the mobile station, where the offline charging data is for use in billing the end-user of the mobile station via an offline charging mechanism.

2. The apparatus according to claim 1, further comprising causing the apparatus to reply to received service authorization requests.

3. The apparatus according to claim 1, where the online charging method comprises prepaid services and where the offline charging method comprises at least one of post-paid services and a monthly contract subscription for the end-user of the mobile station.

4. An apparatus, comprising:
   at least one processor; and
   at least one memory including computer program code, where the at least one memory and the computer program code are configured, with the at least one processor, to cause the apparatus to at least:
   receive a service charging attribute request from a service authorization node associated with a second network, where the apparatus is associated with a first network, the service charging attribute request being received in response to a service request originated by a mobile station for a particular service when the mobile station is roaming in the second network, where the first network is a home network of the mobile station;
   determine which charging attribute storage node of a plurality of charging attribute storage nodes associated with the first network can satisfy the received service charging attribute request;
   transmit said service charging attribute request to a determined charging attribute storage node of the plurality of charging attribute storage nodes,
   receive charging attribute information from said determined charging attribute storage node of the plurality of charging attribute storage nodes, the charging attribute information comprising charging attributes of the mobile station for use by the second network in providing charging data to the first network in order to charge an end-user of the mobile station for the particular requested service; and
   transmit said received charging attribute information to the service authorization node, where the charging attribute info anon includes an indication of an online or an offline charging method used by the mobile station and where for at least a case that the charging attributes include an indication of an online charging method, the charging attributes further include an address of a charging server to which charging information should be directed, and for a case that the charging attributes include an indication of an offline charging method, the charging attributes further include an indication that offline charging data is to be receive from the service authorization node after a requested service is delivered to the mobile station, where the offline charging data is for use in billing the end-user of the mobile station via an offline charging mechanism.

5. The apparatus according to claim 4, further comprising causing the apparatus to transmit information identifying the determined one of the plurality of charging attribute storage nodes to the service authorization node.

6. The apparatus according to claim 4, further comprising: causing the apparatus to transmit said changing attribute request to the determined one of the plurality of charging attribute storage nodes with information identifying the service authorization node, the information being sufficient to enable the determined one of the plurality of charging attribute storage nodes to send charging attribute information to the service authorization node, the charging attribute information comprising charging attributes of the mobile station for the particular requested service.

7. The apparatus according to claim 4, where the online charging method comprises prepaid services and where the offline charging method comprises at least one of post-paid services and a monthly contract subscription for the end-user of the mobile station.

8. A method, comprising:
receiving at a service authorization node a service authorization request in response to a mobile station requesting a particular service, where the mobile station is roaming in a first network that comprises the service authorization node;
determine a charging attribute storage node of a plurality of charging attribute storage nodes associated with a home network of the mobile station which can satisfy a service charging attribute request for the service authorization;
transmitting the service charging attribute request towards the charging attribute storage node of a plurality of charging attribute storage nodes associated with the home network of the mobile station;
receiving service charging attribute information from said determined charging attribute storage node of the plurality of charging attribute storage nodes associated with the home network of the mobile station, the service charging attribute information comprising charging attributes of the mobile station for use by the first network in providing charging data to the home network in order to charge an end-user of the mobile station for the particular requested service, where the received service charging attribute information includes an indication of an online or an offline charging method used by the mobile station and where for a case that the charging attribute information includes an indication of an online charging method, the charging attribute information further includes an address of a charging server to which charging information should be directed; and the method further comprising
for a case that the charging attributes include an indication of an offline charging method, transmitting offline charging data after a requested service is delivered to the mobile station, where the offline charging data is for use in billing the end-user of the mobile station via an offline charging mechanism; and
transmitting a reply to the received service authorization request.

9. A method according to claim 8, where receiving service charging attribute information comprises receiving information identifying the charging attribute storage node.

10. The method according to claim 8, performed as a result of execution of computer program instructions by a processor, the computer program instructions being embodied on a non-transitory computer readable medium.

11. The method according to claim 8, where the online charging method comprises prepaid services and where the offline charging method comprises post-paid services and a monthly contract subscription for the end-user of the mobile station.

12. A method, comprising:
receiving in a first network a charging attribute request from a node associated with a second network, the charging attribute request being received in response to a service request originated by a mobile station for a particular service when the mobile station is roaming in the second network, where the first network is a home network of the mobile station;
determining a charging attribute storage node of a plurality of charging attribute storage nodes associated with the first network to satisfy said charging attribute request;
transmitting said charging attribute request to the determined charging attribute storage node;
receiving charging attribute information from the determined charging attribute storage node; and
transmitting said charging attribute information to the node from which the charging attribute request was received, where the charging attribute information is for use by the second network in providing charging data to the first network in order to charge an end-user of the mobile station for the particular service, where the charging attribute information includes an indication of an online or an offline charging method used by the mobile station and where for a case that the charging attribute information includes an indication of an online charging method, the charging attribute information further includes an address of a charging server to which charging information should be directed; and for a case that the charging attribute information includes an indication of an offline charging method, receiving offline charging data after a requested service is delivered to the mobile station, where the offline charging data is for use in billing the end-user of the mobile station via an offline charging mechanism, where the offline charging data is for use in billing the end-user of the mobile station via an offline charging mechanism.

13. The method according to claim 12, performed as a result of execution of computer program instructions by a processor, the computer program instructions being embodied on a non-transitory compute readable medium.

14. The method according to claim 12, where the online charging method comprises prepaid services and where the offline charging method comprises at least one of post-paid services and a monthly contract subscription for the end-user of the mobile station.

15. A method, comprising:
receiving at a node in a first network a charging attribute request from a node associated with a second network, the charging attribute request being received in response to a request originated by a mobile station for a particular service when the mobile station is roaming in the second network, where the first network is a home network of the mobile station;
determining a charging attribute storage node of a plurality of charging attribute storage nodes associated with the first network to satisfy the charging attribute request; and
transmitting the charging attribute request to the determined charging attribute storage node in conjunction with information that identifies the node associated with the second network, the information being sufficient to enable the determined charging attribute storage node to send charging attribute information to the node from which the charging attribute request was received, the charging attribute information comprising charging attributes of the mobile station for use by the second network in providing charging data to the first network in order to charge an end-user of the mobile station for the particular requested service, where the charging attribute information includes an indication of an online or an offline charging method used by the mobile station.

16. The method according to claim 15, performed as a result of execution of computer program instructions by a processor, the computer program instructions being embodied on a non-transitory computer readable medium.

* * * * *

UNITED STATES PATENT AND TRADEMARK OFFICE
CERTIFICATE OF CORRECTION

PATENT NO.        : 8,670,744 B2                         Page 1 of 1
APPLICATION NO.   : 11/069256
DATED             : March 11, 2014
INVENTOR(S)       : Hurtta et al.

It is certified that error appears in the above-identified patent and that said Letters Patent is hereby corrected as shown below:

In the Claims

In Claim 4:
Column 14, line 51, "info anon" should be deleted and --information-- inserted.

In Claim 6:
Column 15, line 4, "changing" should be deleted and --charging-- inserted.

Signed and Sealed this
Third Day of June, 2014

Michelle K. Lee
*Deputy Director of the United States Patent and Trademark Office*